United States Patent [19]

Schulman et al.

[11] 4,005,792
[45] Feb. 1, 1977

[54] AUTOMATIC UNLOADING APPARATUS

[75] Inventors: Charles Schulman, Paris; Roger M. Petit, Clichy, both of France

[73] Assignee: I E R Impression Enregistrement des Resultats S.A., Paris, France

[22] Filed: Oct. 16, 1975

[21] Appl. No.: 623,255

[30] Foreign Application Priority Data

Oct. 22, 1974 France .............................. 74.35392

[52] U.S. Cl. ................................ 214/309; 214/310
[51] Int. Cl.$^2$ ...................................... B65G 65/04
[58] Field of Search ................... 214/309, 510, 310; 271/149, 150, 162, 214

[56] References Cited

UNITED STATES PATENTS

| | | | |
|---|---|---|---|
| 3,045,846 | 7/1962 | Clark | 214/310 |
| 3,260,388 | 7/1966 | Anderson | 214/310 |
| 3,687,316 | 8/1972 | Wahle | 214/310 |
| 3,863,789 | 2/1975 | Hunter et al. | 214/314 |
| 3,913,643 | 10/1975 | Lambert | 214/310 |
| 3,915,338 | 10/1975 | Kronseder et al. | 271/149 |

*Primary Examiner*—Robert J. Spar
*Assistant Examiner*—Lawrence J. Oresky
*Attorney, Agent, or Firm*—Roylance, Abrams, Berdo & Kaul

[57] ABSTRACT

An automatic unloading apparatus is adapted for use in unloading mail from a container and delivering such unloaded mail to a mail sorting machine separator. The mail is initially provided in an open topped container having openings or apertures formed at the lower forward end thereof. The unloading apparatus includes blades which can pass through the openings or apertures into the container and beneath the mail therein. The unloading apparatus also includes fingers movable perpendicularly through the blades and a movable carriage upon which the blades and fingers are mounted. After the fingers are raised to act as a forward stop for the mail, the blades are raised to remove the mail from the container. The carriage moves forwardly to deliver the removed mail to the sorting machine separator and then moves rearwardly to discharge the empty container.

12 Claims, 14 Drawing Figures

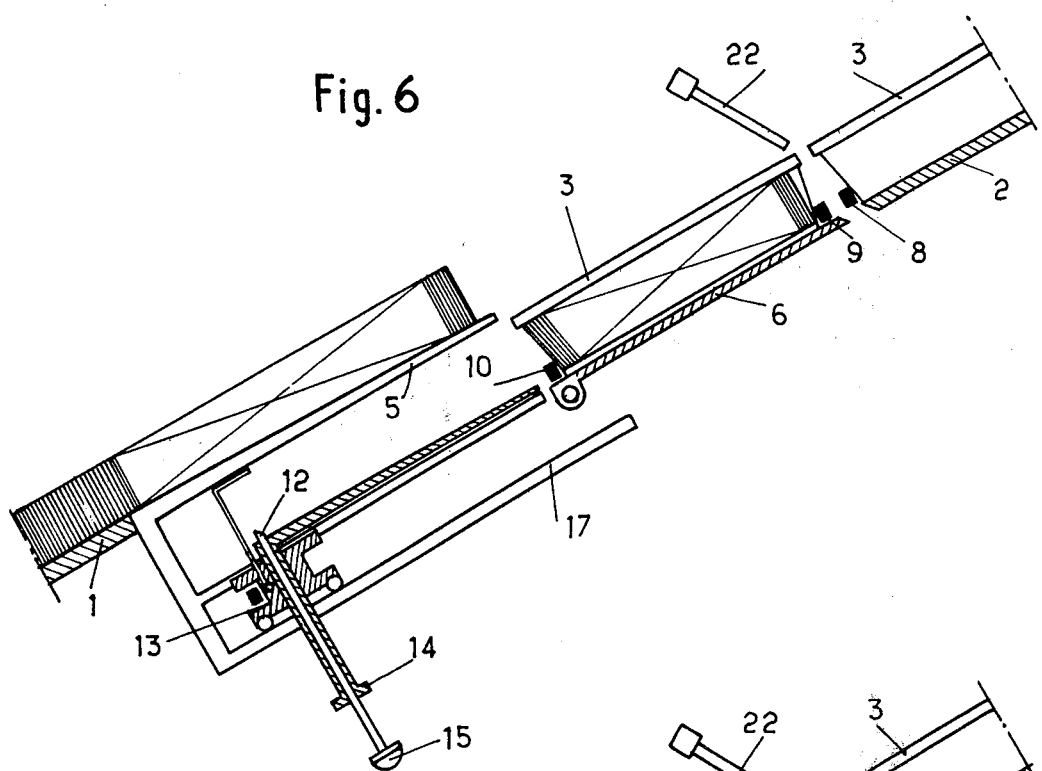
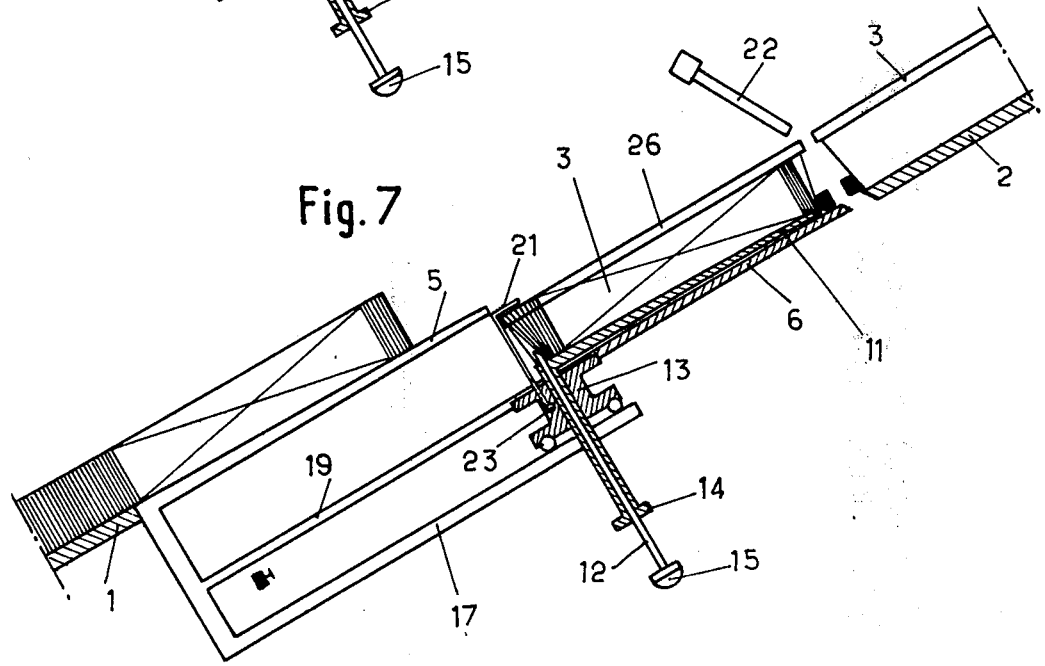

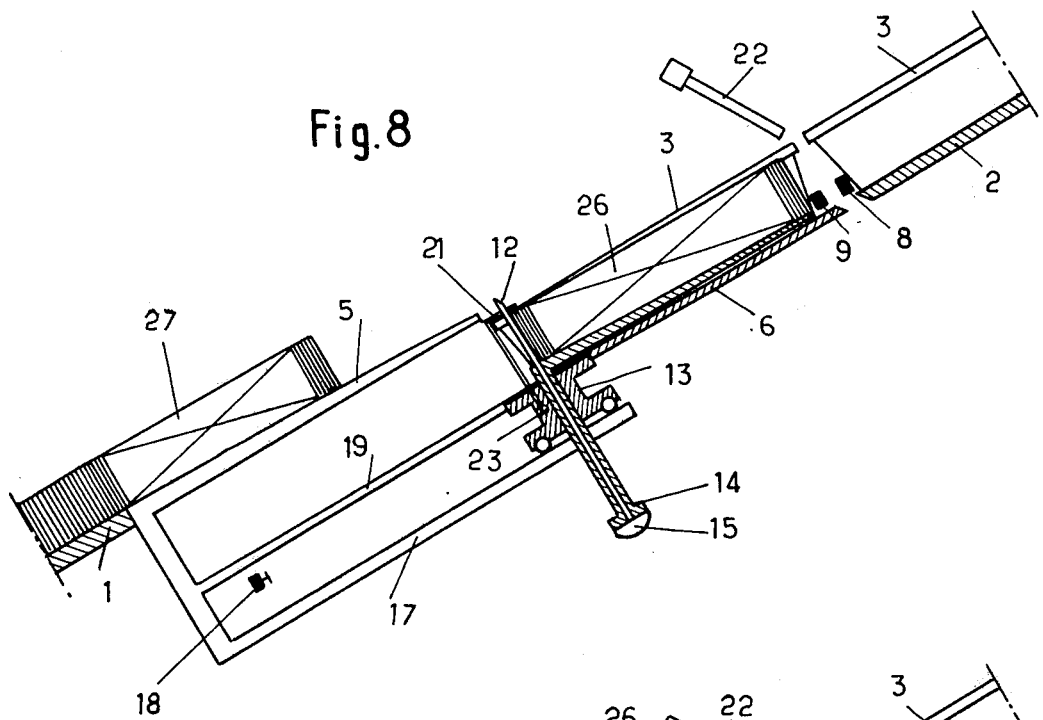
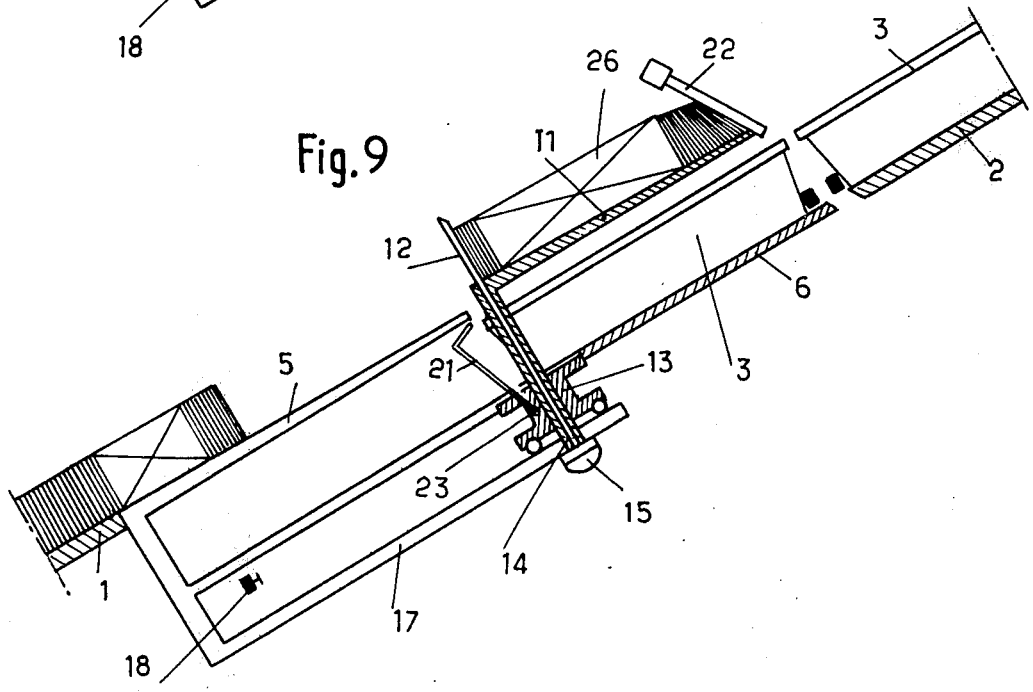

AUTOMATIC UNLOADING APPARATUS

This invention relates to automatic unloading apparatus and more particularly it relates to equipment adapted for use in unloading mail from a container and delivering such unloaded mail to a mail sorting machine separator.

At mail sorting facilities which utilize a sorting machine separator, it is common to supply the mail to such a machine by means of rectangular containers in the form of open-toped boxes or tubs in which the envelopes are aligned, one envelope adjacent to the next one. Such envelopes ordinarily are faced in the direction of the sorting machine and have their bottom edges resting upon longitudinal supporting ribs extending along the bottom of the container. To feed the mail into the machine, the envelopes must be extracted from the containers and placed upon the entrance conveyor to the sorting machine, which conveyor often takes the form of an inclined plane.

In order to extract the envelopes from their containers, mail sorting facilities have for many years resorted to the use of manual labor. Thus, a worker may move a container full of mail to a position adjacent to the sorting facilities, remove the envelopes from the container by hand, manually place the removed envelopes on the entrance conveyor to the sorting machine, then remove the empty container and thereafter repeat the process. Such a technique quite naturally entails considerable labor expense and it is therefore considered beneficial to provide an automatic unloading apparatus which would replace manual labor in extracting the mail from the containers. There have in the past been attempts to provide some form of automated apparatus for accomplishing this mail extracting or unloading but the known forms of equipment have not proved entirely satisfactory in use. The reason for such unsatisfactory performance has generally been due to the complexity of the apparatus which has made the apparatus quite expensive and somewhat unreliable, thus requiring an attendant to be on hand at all times anyway to make certain that the apparatus is properly unloading the mail from the containers.

In view of the foregoing, it is an object of the present invention to provide an effective automatic unloading apparatus which can remove or extract mail from a container and deliver such extracted mail to a mail sorting machine without the presence of or assistance of a human attendant.

Another object of the present invention is to provide a novel and unique form of automatic unloading apparatus which can be readily installed and used in conjunction with conventional mail sorting apparatus for the purpose of unloading a plurality of envelopes from a container and delivering such unloaded envelopes to the mail sorting machine.

Other objects, advantages and salient features of the invention will become apparent from the following detailed description, which, taken in conjunction with the annexed drawings, discloses a preferred embodiment of the invention.

The foregoing objects are attained by providing aperture means at the lower forward end of the open-topped mail container and by providing a mail extraction or unloading apparatus which includes a movable carriage, a blade means movable by the carriage in a direction parallel to the path of movement of the container so that the blade can enter through the aperture means and into the bottom of the container, and finger means carried by the carriage and movable perpendicularly to the blade means. When the incoming container of mail reaches a preselected stop position, the carriage is moved until the blade means passes through the aperture means and into the bottom of the container beneath the mail therein. Then, the finger means are actuated to move the fingers upwardly in a perpendicular direction to the blade thus providing a forward stop or abutment against which the mail can rest. A pivotable retaining member adjacent the front of the container serves to assure that the upward movement of the fingers will not inadvertently extract or drag out any envelopes as the fingers move upwardly.

Thereafter, the entire blade means is raised upwardly so that the mail is lifted above the level of the container and is supported upon the blade means with the forward envelopes resting against the now extended fingers and the rearward envelopes being held in position by a fixed retaining member. The carriage is then moved forwardly until it contacts a microswitch at which time the stack of mail supported upon the blade means will be adjacent to the loading conveyor for the sorting machine separator. Such forward movement of the carriage will have necessarily also created a corresponding forward movement of the empty container which remains disposed beneath the blade means. Once the microswitch has been contacted, the fingers are retracted and the blade means is lowered into the bottom of the container thus depositing the mail along a receiver table adjacent to the sorting machine conveyor. The carriage is then moved rearwardly to reposition the now empty container upon a pivotable plate and the plate is pivoted so that the empty container can be redirected.

Finally, as will be explained, the fingers even when retracted project slightly above the plane of the blade means to create a small empty space adjacent the front wall of the container so that when the fingers are activated and raised upwardly no envelope will inadvertently be stuck between the fingers and the forward wall.

Referring now to the drawings which form a part of this original disclosure:

FIGS. 6 through 14 are diagrammatic elevational views showing the sequential operation of the apparatus of the present invention.

Figure 1:
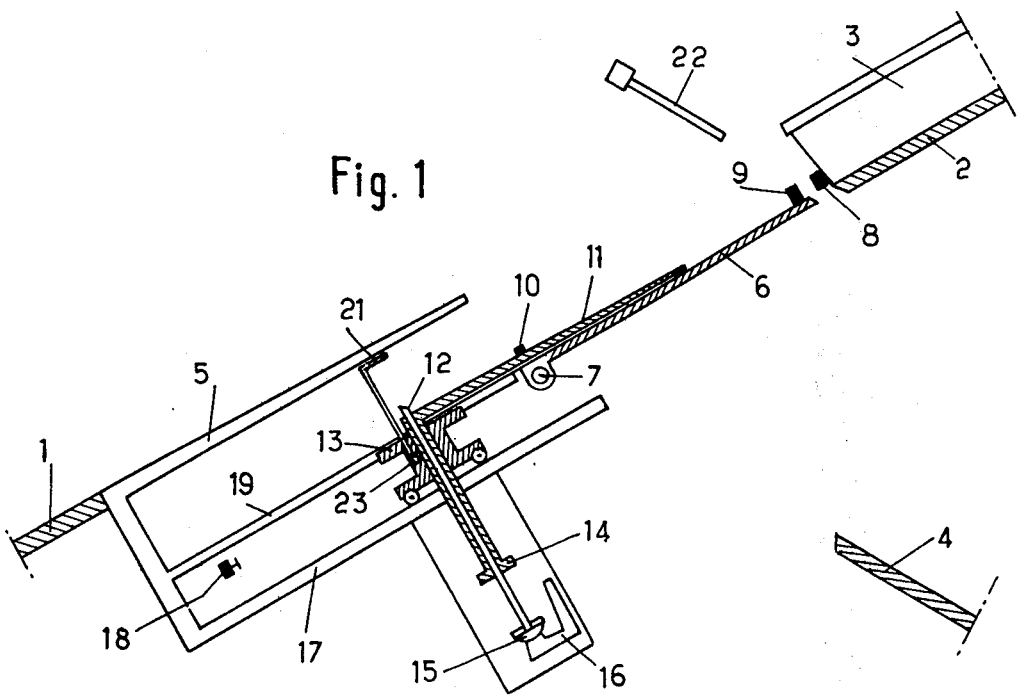
FIG. 1 is a side elevational view, partly in section, of an automatic unloading apparatus in accordance with the principles of the present invention.

Referring now to the drawings in further detail, an inclined plane 1 forms the entrance conveyor for a mail sorting machine separator which is not shown herein since the details hereof form no part of the present invention. A guide conveyor 2, also in the form of an inclined plane, which is parallel to but spaced beneath the plane 1, serves as the means by which the mail containers 3 are delivered from a supply thereof, such as a shunting magazine, which is not illustrated. The apparatus forming the present invention is disposed between the inclined planes 1 and 2, and, as is illustrated, all of the apparatus of the present invention is inclined at the same angle as the planes 1 and 2.

Figure 14:
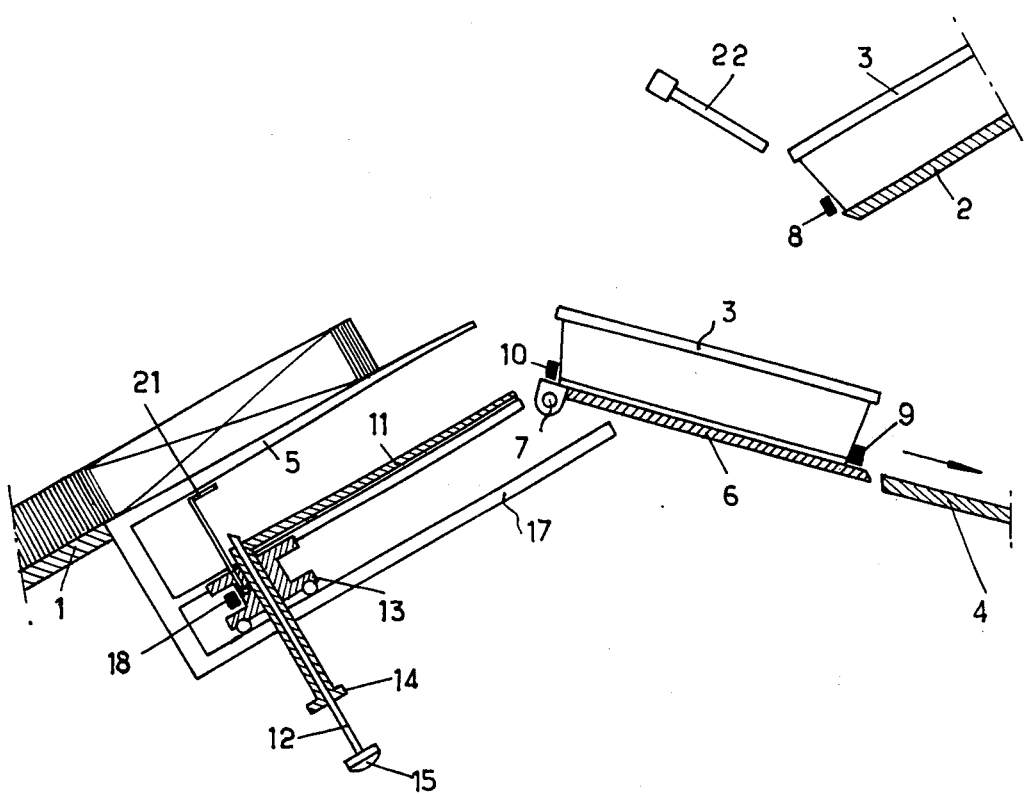

An opposed return guide 4 in the form of an inclined plane extending in the opposite direction is illustrated in FIG. 1 and in FIG. 14. The purpose for this return guide plate is to redirect the empty containers 3 to their source after the mail has been removed from such containers.

The apparatus of the present invention includes a receiver table 5, the forward end of which is disposed adjacent to the inclined plane 1 of the separator as illustrated in FIG. 1. A receiver plate 6 is disposed in alignment with the supply guide conveyor 2 and is mounted upon a pivot shaft 7 which extends laterally across the receiver table.

Retractable stop members 8, 9 and 10 are provided in the apparatus of the present invention for appropriate positioning of the mail containers 3. The stop 8, as illustrated in FIG. 1, is disposed at the forward end of the inclined plane 2 to retain a full container 3 in a stop position until such time as the container in the automatic unloading apparatus has been emptied and discharged. The stop 9 is provided adjacent the rear end of the receiver plate 6 while the stop 10 is provided adjacent the forward end of the plate 6 and in centrally spaced alignment above the pivot shaft 7.

Figure 2:
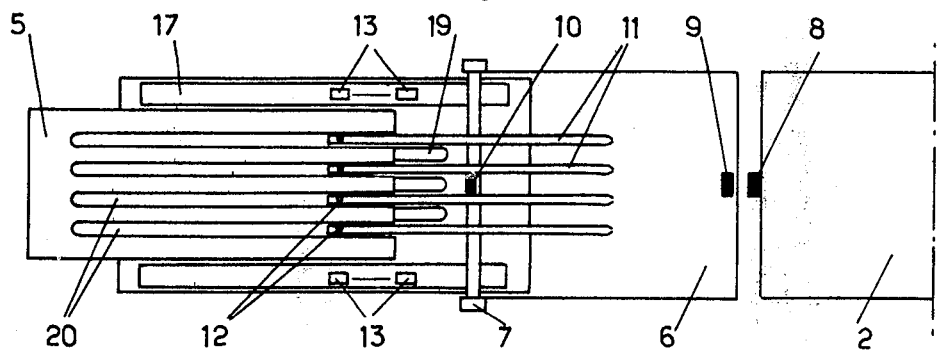
FIG. 2 is a top plan view thereof.

A blade means 11 is provided as part of the unloading apparatus and this blade means is in the form of a fork having four parallel arms or tines as can best be seen from FIG. 2. The blade means 11 is mounted for movement directly above the receiver plate 6 and hence for movement parallel to the inclined planes 1 and 2 and the table 5. Cooperating with the blade means is a set of finger means 12 which is also formed of four spaced cooperating fingers which are mounted adjacent the forward end of the blade means and are movable in a direction perpendicular to the blade means.

Both the blade means 11 and the finger means 12 are carried by a movable carriage 13 having wheels thereon adapted to traverse along a roller track 17 disposed in parallel relation beneath the receiver table 5. The movable carriage 13 has a series of depending sleeves 14 which project beneath the carriage and which terminate in an enlarged flange. The fingers 12 project through these sleeves 14 and at the lower end of the fingers 12 there is provided an enlarged head 15 which abuts against the flange on the end of the sleeve 14 to terminate upward movement of the fingers. A control element or command element 16, also carried by the carriage 13, is provided beneath the enlarged heads and this control element 16 serves to raise both the finger means and the blade means.

A micro switch 18 is provided beneath the receiver table 5 to serve as a motion limiting means for the movable carriage 13. An intermediate track 19 is provided beneath the receiver table 5 but above the carriage roller track 17, with the track 19 being generally coextensive with the plane of the receiver plate 6. Longitudinal slits are provided in the track 19 and similar longitudinal slits 20 are provided in the table 5 to permit passage of the blade means and finger means.

A movable retaining means 21 in the form of an inverted L-shaped member is provided at the forward end of the blade means, with such retaining member being pivotally mounted on a horizontal shaft 23 which is attached to the carriage means. As such, the movable retaining means can be moved from its position as shown in FIG. 1 to the position shown in FIG. 9. Longitudinal slits not illustrated are provided through the upright portion of the retaining member 21 to permit passage of the upper ends of the fingers 12. Another fixed retaining member 22 is provided at an angle generally parallel to that of the discharge guide plane 4 and in spaced relation slightly above the level of the receiver table 5. The fixed retaining member 22 is also provided with slits to allow passage of the free ends of the arms on blade means 11.

Figure 3:
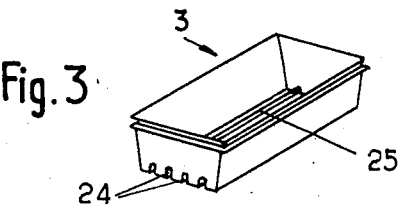
FIG. 3 is a perspective view of a container in accordance with the present invention.

The box or container 3 of the present invention is shown in FIG. 3 to be a generally rectangular opentopped box or container into which the mail can be inserted in a cross-wise stack. The forward wall of the container is provided with aperture means 24, which, as illustrated, are four in number to permit introduction of the four arms of the blade means 11. A series of longitudinal ribs 25 are formed along the bottom of the container means and the envelopes rest upon these ribs rather than directly upon the bottom of the container. Thus, the spaces between the adjacent ribs 25 provide passages through which the arms of blade means 11 can pass. These arms can be tapered or thinned somewhat at their forward end, as is illustrated in FIG. 1, to facilitate their introduction under the mail which is ordinarily contained in container 3.

Figure 5:
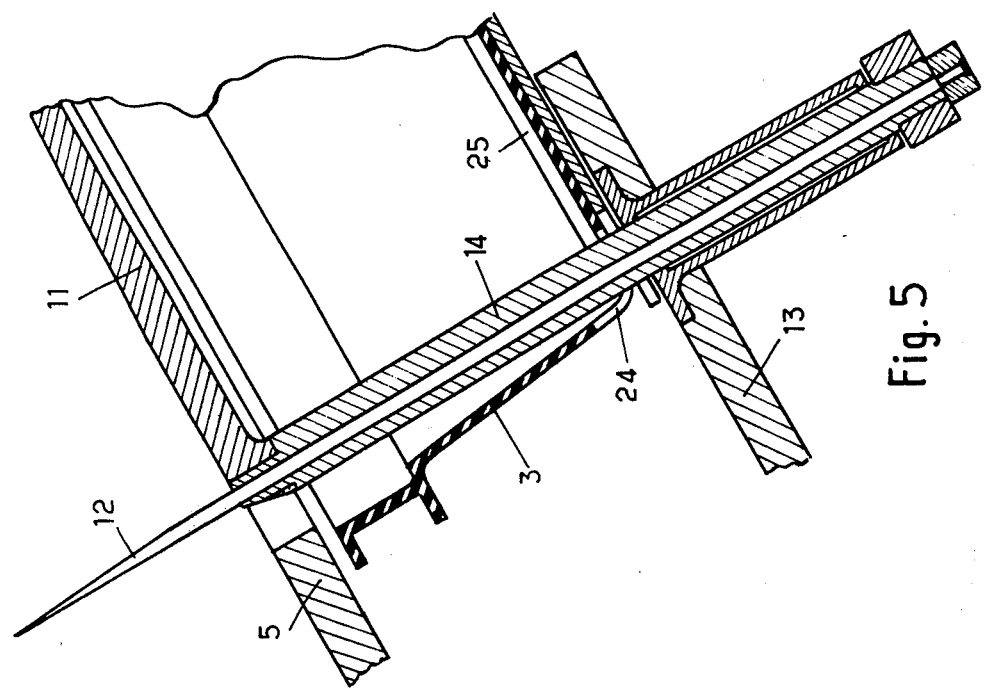
FIG. 5 is a fragmentary sectional view, similar to FIG. 4, but showing the finger means and blade means in a raised or elevated position.
Figure 4:
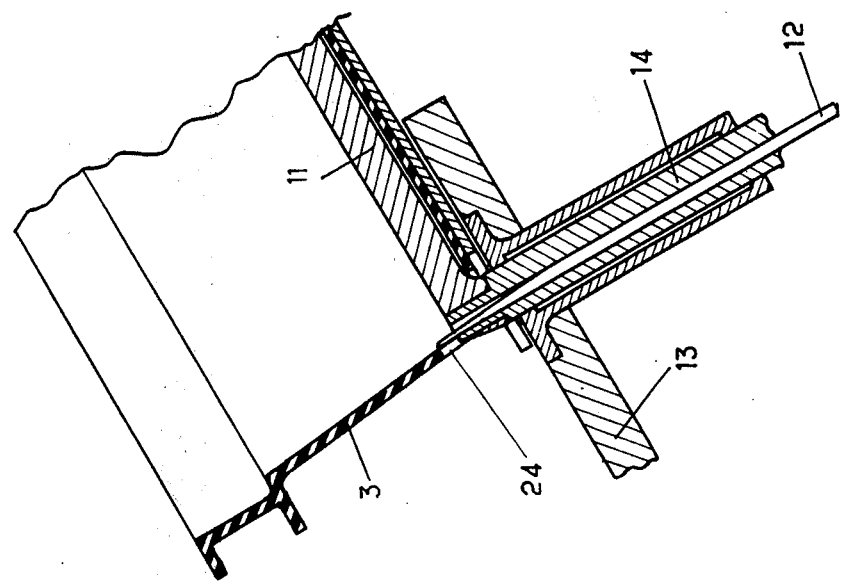
FIG. 4 is an enlarged fragmentary sectional view showing the finger means and blade means in lowered or retracted position.

As shown in FIG. 4, the height of the apertures 24 is sufficient to allow passage of the tapered upper ends of the fingers 12, which, even in their retracted position, still extend slightly above the top of the blade means 11. In the FIG. 4 embodiment, the slight projection of the end of the finger means 12 serves to assure that no envelope can be trapped between the finger and the forward wall of the container 3. Thus, when the control element 16 raises both the finger means and the blade means to the position shown in FIG. 5, no envelopes will be trapped between the sleeve 14 and the front of the container 3, but instead, all such envelopes will be retained upon the blade means 11 with the forward most envelope abutting against the now extended fingers 12.

To understand the operation of the apparatus of the present invention, attention is directed to FIGS. 6 through 14 which show in sequential steps or phases, the nine successive operational steps which are carried out by the automatic unloading apparatus of the present invention.

In the first phase, as shown in FIG. 6, the retaining stops 8 and 9 are momentarily retracted to permit a container 3 which is filled with a packet of mail 26 to slide forwardly under its own weight from the inclined plane 2 onto the receiver plate 6. When forward progress of the container 3 is halted by engagement against the retaining stop 10, the retaining stops 8 and 9 are again released with the stop 8 preventing the advance of the next adjacent container 3 and the stop 9 serving to firmly position the container 3 on the receiver plate 6 and prevent any rearward movement thereof.

In the second phase of operation, as illustrated in FIG. 7, the carriage 13 is moved rearwardly along the roller track 17 to permit the arms of blade means 11 to pass through the apertures, between the adjacent ribs 25 in the bottom of the container 3, and hence beneath the mail packet 26 that is disposed within that container. When this rearward movement of the carriage is completed, the blade means and finger means will be in the position shown in FIG. 4 and the projecting ends of the fingers will thus thrust lightly against the bottom of the mail 26 creating an empty space adjacent the forward wall of the container to provide a passage for upward movement of the fingers.

In the third phase of operation, as illustrated in FIG. 8, the control element 16 raises the fingers 12 until the enlarged head 15 thereof abuts against the flange at the lower end of the sleeves 14. Because of the slight empty space previously created, none of the forward envelopes can remain wedged against the forward wall of the container 3. Similarly, the rearwardly directed portion of the retaining means 21 serves to assure that upward movement of the fingers cannot drag the forward few envelopes upwardly. This third phase of movement is completed when the ends of the fingers 12 pass through longitudinal slits provided in the retaining means 21.

In the fourth phase as illustrated in FIG. 9, the retaining means 21 is rotated about its pivot shaft 23 to free the top forward portion of the mail packet 26. Then, the control element 16 pushes upwardly against the enlarged head 15 of the fingers thus raising the sleeves 14 and the blade means 6 which has the effect of lifting the entire mail packet 26 out of the box. The fixed retaining element 22 abuts against and slopes forwardly the rearmost envelopes of the packet 26. At the end of the lifting of the blade means, the ends of the arms on the blade means extend through aligned slits in the retaining member 22 and the entire packet of mail 26 has been removed from its container 3 and rests upon the blade means 11 and against the raised fingers 12.

Figure 10:
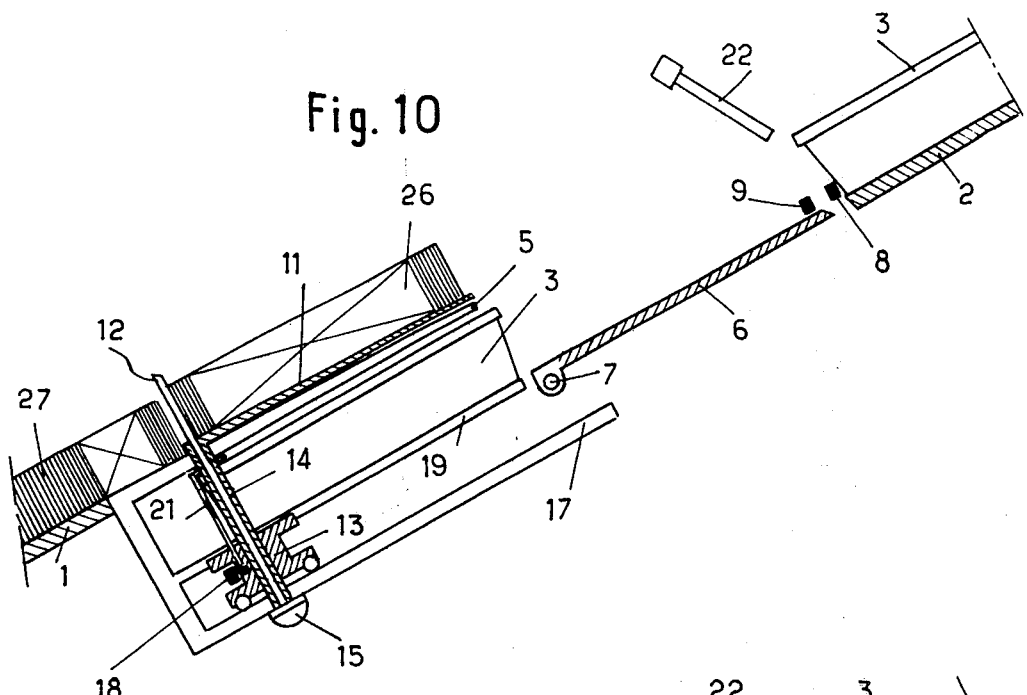

In the fifth phase of operation, as illustrated in FIG. 10, the forward stop member 10 is retracted, the retaining member 21 is returned to its original position and the carriage 13 moves down the roller track 17 until such time as it contacts and actuates the microswitch 18. During this movement of the carriage, which occurs by the gravitational force of the weight of the carriage and the members retained thereby, the mail which is carried by the blade means 11 passes across the top of the receiver table 5 and the sleeves 14 pass through the slots 20 in such table. The empty container 3 is carried by and hence movable with the carriage and when the carriage reaches the position where microswitch 18 is actuated, it will be seen that the packet of mail 26 is disposed immediately adjacent to the stack of mail 27 on the inclined plane 1 of the mail sorting separator.

Figure 11:
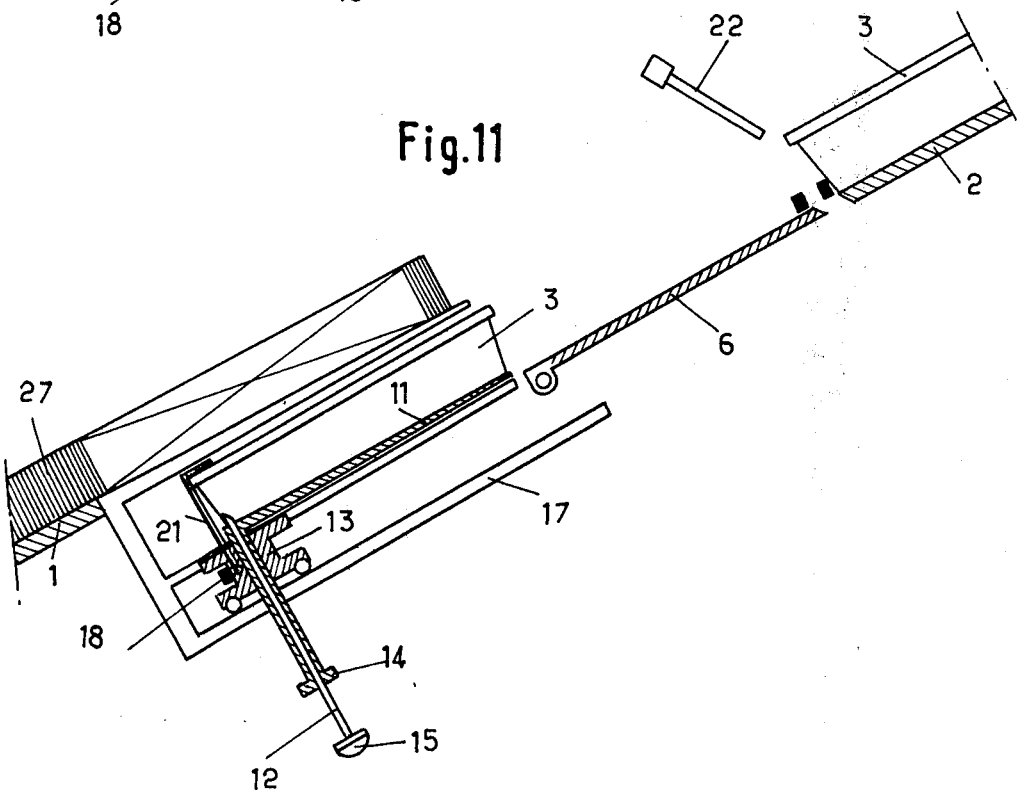
Figure 12:
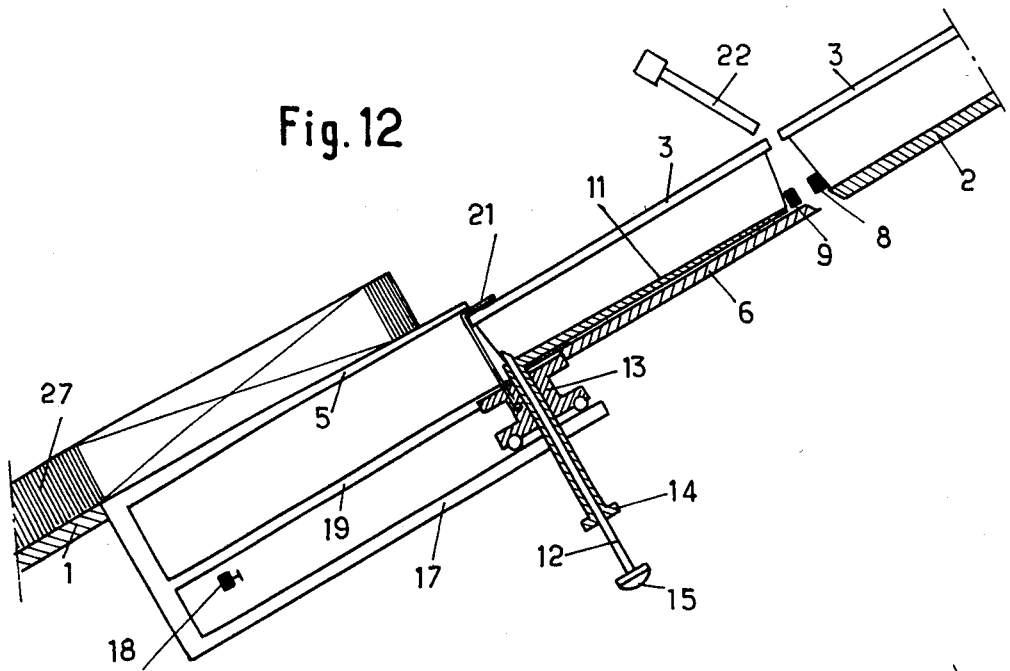

In the sixth phase of operation which is illustrated in FIG. 11, actuation of the microswitch 18 has retracted the command element 16 which in turn has lowered the finger means 12 and the blade means 11 back into their initial position within the now empty container 3. The mail 26 remains deposited upon the table 5 and becomes the terminal portion of the stack 27 of mail being supplied to the sorting machine.

In the seventh phase of operation, as shown in FIG. 12, the carriage 13 again moves upwardly along the roller track until the now empty container 3 is positioned again above the receiver plate 6. At this time, the forward stop 10 is again actuated to thus retain the empty box or container 3 in position upon the receiver plate 6.

Figure 13:
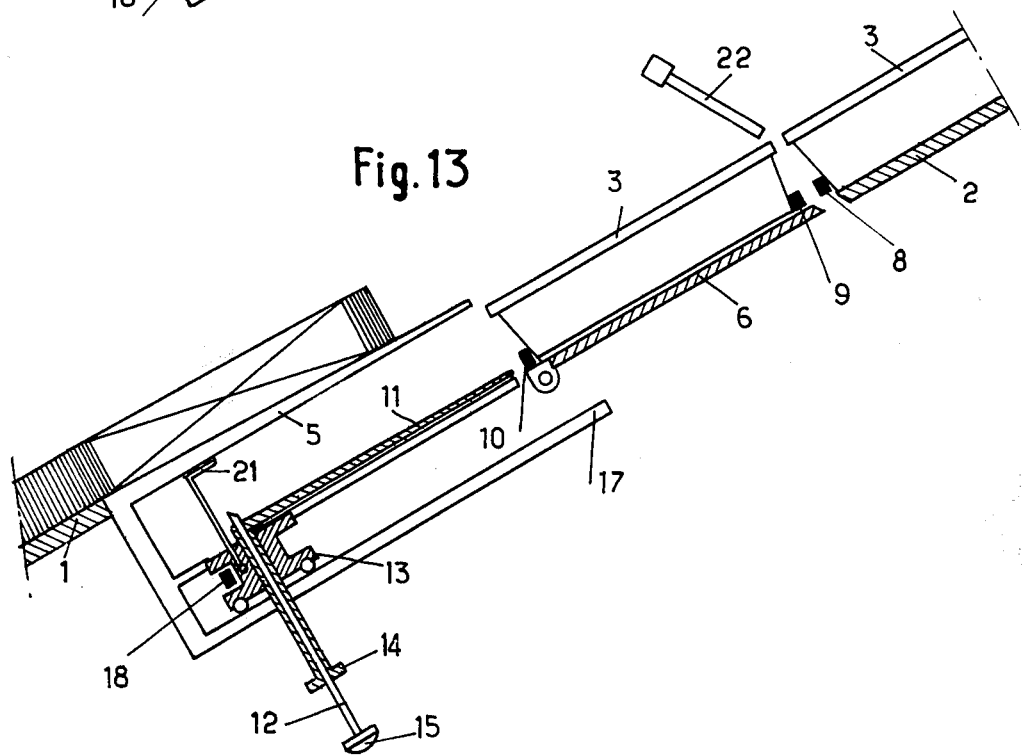

In the eighth phase of operation, as illustrated in FIG. 13, the carriage means again moves back down the lower track 17 thereby retracting the blade means 11 from the empty container 3.

Finally, in the ninth phase of operation, as illustrated in FIG. 14, the actuation of the microswitch 18 which occurs when the carriage reaches the end of its path of travel back down the track 17, causes a rotation of the plate 6 about the horizontal shaft 7. As such rotation occurs, the plate 6 is swung to the position shown in FIG. 14. The stop member 9 is then retracted to permit the now empty container 3 to slide along the discharge guide or conveyor 4, whereupon the plate 6 is returned to its initial position and the apparatus is ready to commence a new cycle of operation.

It is preferred that the aperture means 24 be provided only along one end of the containers 3 to thus assure that the mail will always be suitably presented to the separator and sorting apparatus. Thus, if a container is presented on the receiver plate 6 with the apertures faced in the wrong direction, namely, rearwardly rather than forwardly, the blade means cannot enter through the apertures and the envelopes hence cannot be unloaded from the container. In such an event, means can be provided for automatically moving the receiver plate 6 either to the discharge position of FIG. 14 or to some other position where the improperly loaded container 3 can be diverted onto an auxiliary track specially provided for this purpose.

Various changes and modifications can be made in connection with the apparatus described herein without departing from the spirit and scope of the invention as defined in the appended claims.

What is clamed is:

1. Apparatus for automatically unloading and delivering the contents, such as a plurality of mail envelopes, from a container, comprising:
    means for supplying a filled container;
    said container having aperture means adjacent the bottom and one end thereof;
    blade means movable parallel to the bottom of said container and being insertable through said aperture means to pass into said container;
    finger means slidably mounted in said blade means and movable substantially perpendicularly to said blade means;
    said finger means being insertable through said aperture means to pass into said container when said blade means is fully disposed within said container; and
    means for displacing said blade means and said finger means relatively to said container to unload and deliver the contents of said container;
    said displacing means including means for initially moving said finger means through said blade means and for subsequently moving said blade means away from said container bottom to lift the contents from said container.

2. Apparatus as defined in claim 1 further including a receiver plate upon which the filled container is deposited by said supplying means and a receiver table onto which the contents of said container are delivered, said receiver plate, blade means and receiver table all being in substantially parallel planar relation.

3. Apparatus as defined in claim 2 wherein said displacing means comprises:
    a carriage means which carries said blade means and said finger means, and
    elevating means for initially moving said finger means and subsequently moving said blade means in a direction substantially perpendicular to said parallel planes of said receiver plate, blade means and receiver table;

said carriage means being movable in a plane parallel to said parallel planes of said receiver plate, blade means and receiver table.

4. Apparatus as defined in claim 3 wherein said elevating means is operative to cause said blade means and finger means to lift the contents from said container while said container rests upon said receiver plate and wherein said carriage means is operative to transfer said lifted contents from a location above said receiver plate to a location upon said receiver table.

5. Apparatus as defined in claim 4 wherein said receiver plate is pivotally mounted to be swingable to a position which discharges the empty container therefrom.

6. Automatic unloading apparatus for extracting a plurality of mail envelopes from a container and for delivering such extracted envelopes to a mail sorting machine, said apparatus comprising:

a receiver table disposed adjacent to the mail sorting machine;

a receiver plate extending in parallel relation to said receiver table;

carriage means movably mounted beneath said table for movement toward and away from said receiver plate;

said carriage means supporting and hence movably mounting a blade means which extends parallel to said receiver table and receiver plate, and finger means which extend substantially perpendicularly through said blade means, and elevating means for moving said finger means from a retracted position where only the ends of said finger means extend through said blade means to an extended position where said finger means project substantially through said blade means, said elevating means also being operative, after said finger means has been moved to an extended position, to raise and lower said blade means and finger means in a direction parallel to said finger means;

means for positioning a container filled with mail envelopes upon said receiver plate;

said container having aperture means adjacent the bottom forward end thereof;

said carriage means being operative to cause said blade means to pass through said aperture means and into said container to extend beneath the mail envelopes therein;

said elevating means being operative after said blade means has been positioned within said container to initially move said finger means from their retracted position to their extended position, thereby positioning said finger means between the forward wall of said container and the forwardmost of said mail envelopes, and subsequently to raise said blade means to thereby raise said mail envelopes out of said container to an elevated position where said mail envelopes are supported upon said blade means resting against said finger means;

said carriage means being further operative, after operation of said elevating means, to move said blade means and finger means forwardly until said mail envelopes are disposed above said receiver table whereupon said elevating means is lowered and said mail envelopes are thus deposited upon said receiver table.

7. Apparatus as defined in claim 6 wherein said receiver plate is pivotally mounted to permit discharge of the empty container after the envelopes have been removed therefrom.

8. Apparatus as defined in claim 6 wherein said means for positioning said container upon said receiver plate includes retractable stop members adjacent the forward and rear ends of said receiver plate, said stop members extending upwardly to engage the ends of said container.

9. Apparatus as defined in claim 6 further including a movable retaining member attached to said carriage means and normally extending above the forward end of said container when said container is positioned upon said receiver plate.

10. Apparatus as defined in claim 9 further including a fixed member positioned above said receiver plate to push against the rearmost of said mail envelopes when they are raised to said elevated position.

11. Apparatus as defined in claim 6 wherein said elevating means includes sleeve means slidably mounted within said carriage means with the upper end thereof attached to said blade means and the lower end thereof depending beneath said carriage means;

said finger means being slidably mounted within said sleeve means;

said finger means having a head portion engageable against the lower end of said sleeve means when said finger means is moved to its extended position, and control means engageable with said head portion to initially move said head portion into engagement with said lower end of said sleeve means, thereby moving said finger means to its extended position, and to subsequently move said sleeve means slidably through said carriage means to hence raise said blade means.

12. Apparatus as defined in claim 6 wherein said blade means includes a plurality of spaced arms and wherein said aperture means includes a plurality of apertures, one of each of said spaced arms.

* * * * *